United States Patent Office 3,806,462
Patented Apr. 23, 1974

3,806,462
OPTICAL ELEMENTS
Stanley M. Bloom, Waban, Mass., assignor to Polaroid Corporation, Cambridge, Mass.
Continuation-in-part of abandoned application Ser. No. 841,259, July 14, 1969. This application Feb. 10, 1972, Ser. No. 225,261
Int. Cl. F21v 9/04; G02c 7/10
U.S. Cl. 252—300
4 Claims

ABSTRACT OF THE DISCLOSURE

Metal complexes of the following formula are useful infrared absorbers in plastic optical elements:

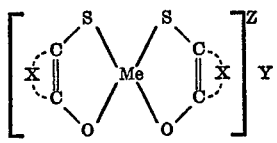

wherein Me is selected from the group consisting of metals of the first, second or third transition metal series, each X represents the atoms necessary to complete the same or different aromatic or heterocyclic ring or substituted derivatives thereof, Z is the integer 1 or 2 and represents the anionic charge on the complex and Y is a monovalent or divalent cation which can neutralize Z.

CROSS REFERENCE TO RELATED PATENT APPLICATIONS

This application is a continuation-in-part of application Ser. No. 841,259 filed July 14, 1969 and now abandoned.

BACKGROUND OF THE INVENTION

Part 1.—The field of the invention

The invention relates to infrared (IR) absorption. More precisely, the invention disclosed herein relates to the use of particular infrared absorbers in plastic optical elements.

Part 2.—Description of the prior art

Optical filtering elements are known products of commerce routinely employed, for example, in sunglasses, welder's goggles, aircraft windows, television filters and in other eye protective filters known to the art. The desired performance characteristics of such elements or filters used in a given application are well defined. For example, the primary characteristic desired for optical filtering elements used as a sunglass lens system is that they reduce the transmission of visible light by at least about 70%. The reduction in the transmission of visible light can be achieved by the use of lens systems employing dyes or light polarizers. The chief advantage of polarized lens systems is that they selectively absorb visible light which is highly polarized in the horizontal plane, e.g., "glare." In contrast thereto, in a lens system employing dyes to reduce transmission of the visible light, the reduction is non-selective. In other words, such a lens does not selectively absorb the polarized light responsible for "glare" but rather diminishes the transmission of all light in the visible region.

Recently, the art has considered the amount of infrared light transmitted by a sunglass lens system to be of importance. Accordingly, the reduced transmission of infrared light is an additional characteristic now included in the performance characteristics desired of optical filtering elements employed as sunglass lens systems.

As those skilled in the art know, radiant energy from the sun is frequently grouped into three regions, the near ultraviolet, the visible and the near infrared. Together, these three regions cover the range of wavelengths from 0.290 micron to about 5.0 microns. Table I below gives the approximate distribution of radiant energy of sunlight.

TABLE I.—APPROXIMATE DISTRIBUTION OF RADIANT ENERGY OF SUNLIGHT

| | | Percent of— | |
|---|---|---|---|
| | Region, μ | Total | Infrared |
| Near ultraviolet | 0.3–0.4 | 5 | |
| Visible | 0.4–0.7 | 42 | |
| Near infrared | 0.7–9.0 | 23 | 43.5 |
| | 1.0–1.3 | 12 | 22.5 |
| | 1.3–1.6 | 4.5 | 8.5 |
| | 1.6–1.9 | 4.5 | 8.5 |
| | 1.9–2.7 | 5 | 9.5 |
| | 2.7–up | 4 | 7.5 |

As can be seen from the above table, the near infrared radiation comprises approximately 53% of the total radiant energy of sunlight while the region from 0.7–1.3μ comprises about 66% of the total infrared radiation. This is the region wherein the art has concentrated its efforts to satisfy the performance characteristics presently desired of sunglass lenses.

As those skilled in the art also know, the problem of reducing the transmission of infrared radiation through optical filter elements is compounded when the elements are fabricated of plastics. For example, a glass lens system having reduced infrared transmission can be readily produced by dispersing various additives in the molten glass. Metallic oxides such as ferric oxides are usually employed as additives which can effectively reduce infrared transmission. The resultant glass lens system which can include a dye or a light polarizer provides a system which reduces the transmission of visible light and also provides desirable protection from invisible radiation.

The use of additives to reduce the infrared transmission characteristics of a plastic lens, however, has proved to be a more vexatious and difficult problem. For example, the inclusion of infrared absorbers in plastomeric lens systems provided what appeared to be a logical approach to the problem. However, in practice, few infrared absorbers have been found to be suitable. Many, for example, are disqualified by reason of their adverse effect on the transmission characteristics of the plastic in the visible region. Others have been disqualified by reason of their inherent instability under the fabrication conditions involved. For example, heat and moisture are usually involved in the fabrication of plastic lens systems. Also, other absorbers have been disqualified by reason of their incompatability with the materials involved in the lens system or the inability to effectively disperse or otherwise associate the absorber with the plastomeric materials. Indeed, to date only a limited number of classes of infrared absorbers are considered effective in reducing infrared transmission in plastic lens systems. One such class of absorbers is described in the applicant's commonly assigned, copending application Ser. No. 577,576, filed Sept. 2, 1966 and now U.S. Pat. 3,588,216. Another class of absorbers is described in British Pats. 1,033,914 and 1,033,915 which relate to the use of triarylaminium salts in plastic optical systems.

SUMMARY OF THE INVENTION

In accordance with the practice of the present invention, novel plastic optical systems are presented which provide a substantial degree of desirable protection to infrared radiation. The essential, distinguishing characteristic of plastic optical systems of the present invention involves the inclusion of a particular metal complex in the system, for example, in at least one of the layers of the system if the system comprises a plurality of such layers. The metal complex functions as an infrared absorber and conforms to the following formula:

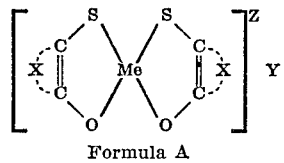

Formula A wherein

Me is selected from the group consisting of metals of the first, second or third transition metal series, i.e., those elements of Group VIII of the Table of Periodic arrangement of the elements, e.g., nickel, cobalt, copper, palladium, or platinum, which will provide a complex which is an effective IR absorber;

each X represents the atoms necessary to complete the same or different aromatic or heterocyclic ring, or a substituted derivative thereof, e.g., halo, nitro, alkoxyalkyl, alkyl and/or alkoxy-substituted aromatic and heterocyclic rings.

As examples of useful aromatic rings, including substituted derivatives thereof, mention may be made of phenyl, naphthyl, methyl-phenyl, methylnaphthyl, alkoxyphenyl and alkoxynaphthyl, e.g., dodecyloxyphenyl, halo-substituted, particularly fluoro-substituted, —S—alkyl-substituted, amino, including dialkylamino-substituted, haloalkyl-substituted, e.g., trifluoromethyl-substituted phenyl and naphthyl radicals, etc.

As examples of useful heterocyclic rings, mention may be made of those of the formula:

where G is nitrogen, oxygen, or sulfur, and substituted derivatives thereof, including benz-substituted derivatives.

In the above formula, Z represents the anionic charge on the complex and can be one or two. Y is a monovalent or divalent cation depending upon the value of Z and the particular cation involved is not in itself critical with respect to absorbing infrared radiation. Instead, as those skilled in the art know, the essential function of cation Y is to neutralize charge Z so that such complexes can be recovered from reaction mixtures after synthesis such as by precipitation or so that such complexes can be effectively dispersed in or admixed with other ingredients. For example, the controlling criterion for selecting a particular cation may be the capability of the cation to most effectively precipitate the anionic portion from a particular reaction medium. Alternatively, the criterion may be the capability of the particular cation to provide the most effective dispersion of the complex in the particular plastomeric material(s) involved. Accordingly, the selection of a specific cation which will facilitate recovery of the anionic complex from the reaction medium and otherwise provide the best balance of selected properties for the particular utilization will be apparent to those skilled in the art. Especially preferred cations are those that will not absorb in the visible region to any appreciable extent. While Y can be such cations as $Na^+$, $K^+$ or $Ca^{++}$, cations found to be especially suitable for recovery of the anionic complex are those containing tetraaryl or tetraalkyl radicals and specific examples of such cations are the monovalent tetrabutylammonium cation or the divalent tetraphenylarsonium cation.

Specific representative compounds embraced within the above formula include among others:

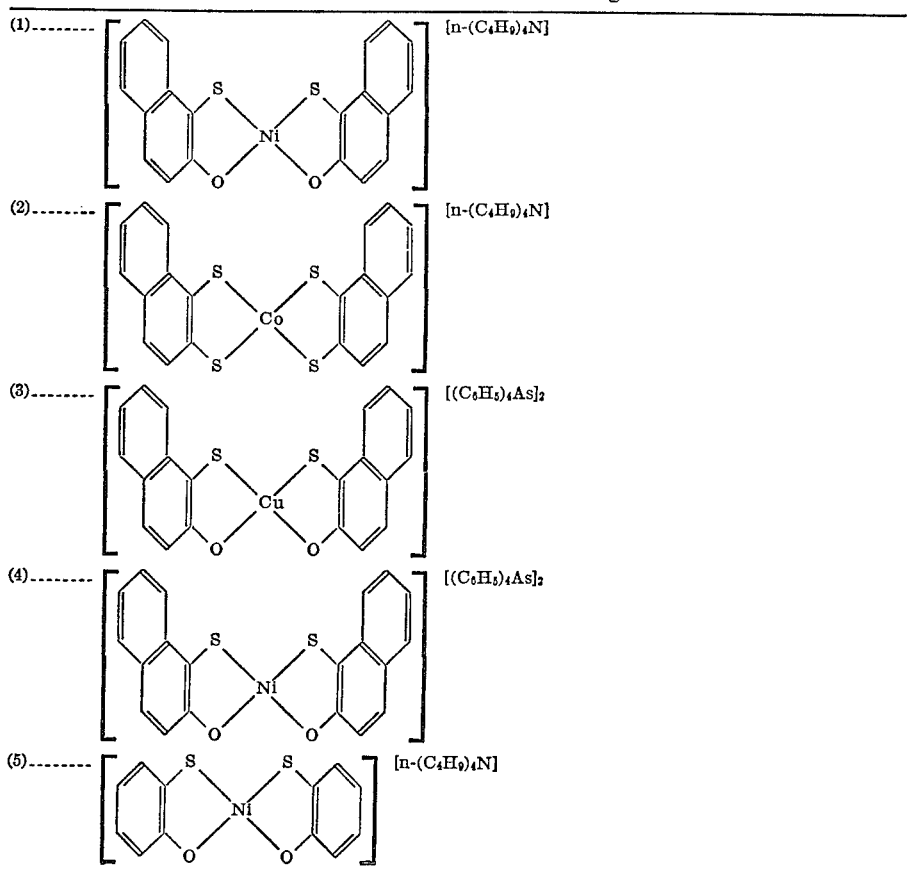

(6) ......... Same as above ......................... [(C₆H₅)₄As]₂
(7) ......... 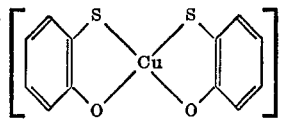 [C₆H₅)₄As]₂
(8) ......... 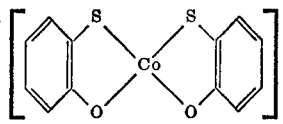 [n-(C₄H₉)₄N]
(9) ......... 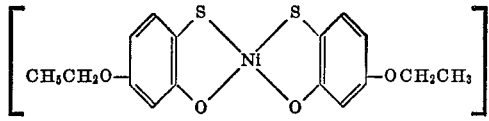 [n-(C₄H₉)₄N]
(10) ......... 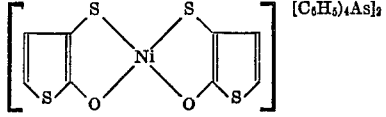 [C₆H₅)₄As]₂
(11) ......... 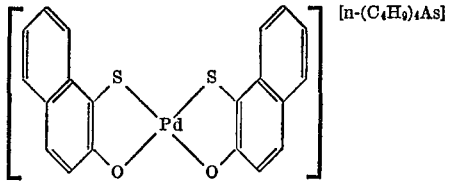 [n-(C₄H₉)₄As]
(12) ......... 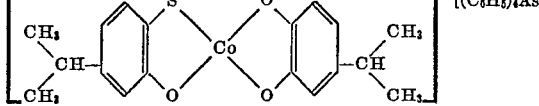 [(C₆H₅)₄As]₂
(13) ......... 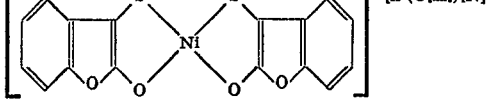 [n-(C₄H₉)₄N]
(14) ......... 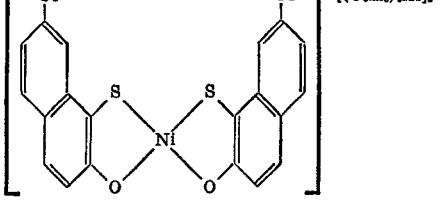 [(C₆H₅)₄As]₂
(15) ......... 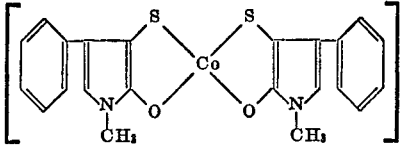 [n-(C₄H₉)₄N]
(16) ......... 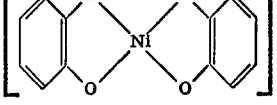 K
(17) ......... 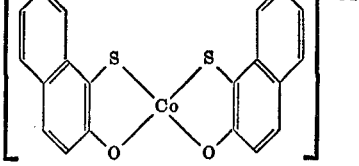 Ca
(18) ......... 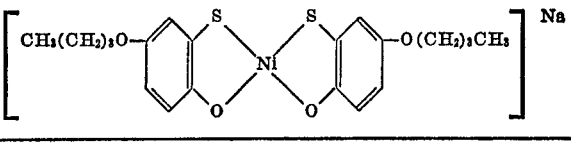 Na Compounds of Formula A are known to the art and can be produced in accordance with the methods described in detail in the article by A. L. Balch entitled "Electron Transfer Series of the [M—O₂S₂] Type. Complexes Derived From O-Mercaptopheno, 1-Mercapto-2-Naphthol and 1-Hydroxy-2-Pyridinethione." J.A.C.S./ 91:8/Apr. 9, 1969. Said article is incorporated herein by reference.

Essentially, the preparation involves the reaction of a metal salt containing the desired metal with a compound of the following structure:

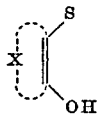

wherein X is the number of carbon atoms to provide the aromatic or heterocyclic rings mentioned before. The reaction is usually conducted in the presence of a cation which can neutralize the charge on the complex, thereby facilitating isolation of the complex.

The compounds of Formula A have been found to possess exceptionally desirable spectral absorption characteristics. They have been found to have a $\lambda_{max}$ in the near infrared region of the spectrum with minimal absorption in the visible region and also a $\lambda_{max}$ in the ultraviolet region of the spectrum, primarily in the far ultraviolet region. Accordingly, they are particularly useful in optical elements wherein it is desired to transmit visible light while absorbing light in the designated invisible regions of the spectrum, e.g., in the near infrared and also in the ultraviolet region of the spectrum.

In addition to their exceptional spectral absorption characteristics, the compounds of Formula A have been found to be extremely stable and resistant to the degradative forces of light, heat, and humidity. Since, as mentioned, IR absorbers as a class are quite unstable and usually incompatible with the materials and/or processing conditions involved in fabricating optical systems, this stability of compounds of Formula A is quite unexpected.

DESCRIPTION OF THE PREFERRED EMBODIMENT

The following detailed description of the preferred embodiment of the present invention will be better understood by reference to the accompanying drawings wherein.

Figure 5:
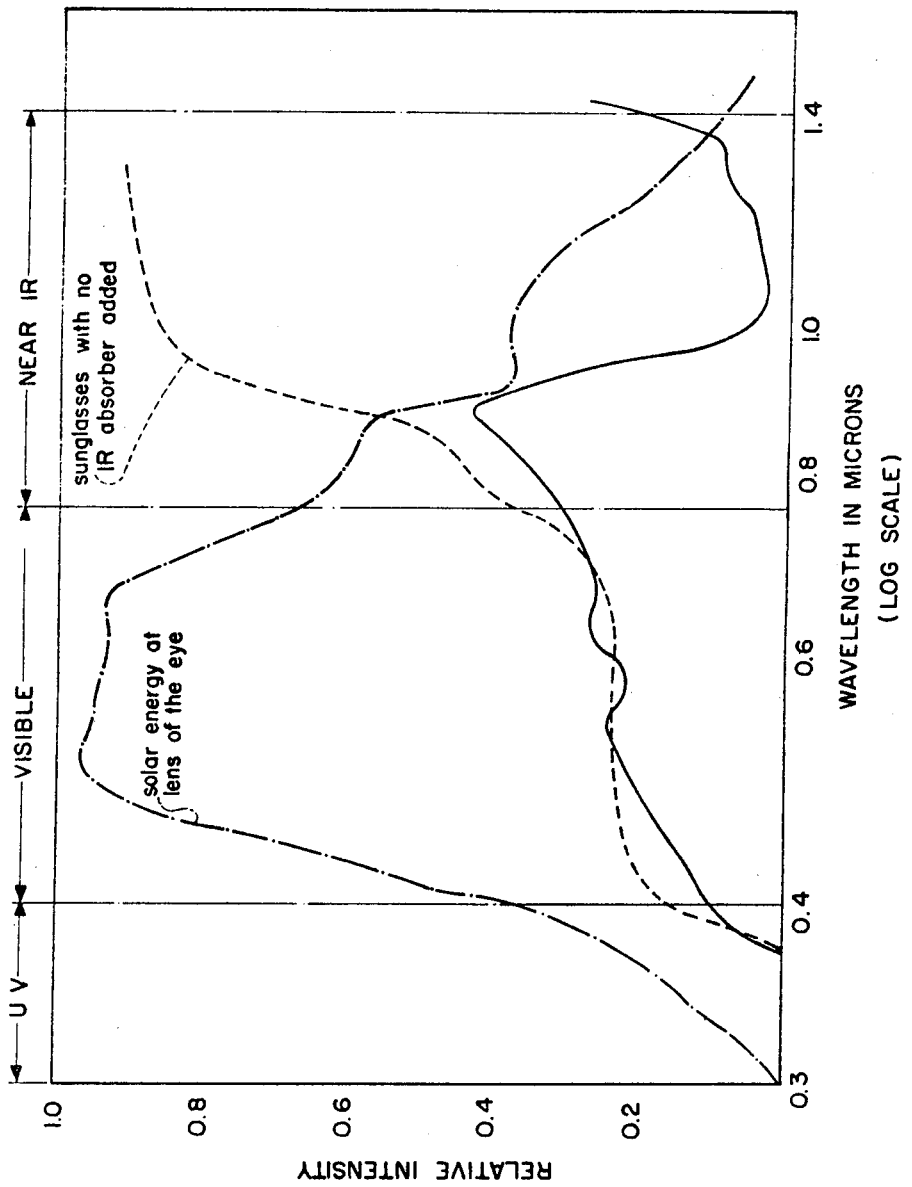
Figure 6:
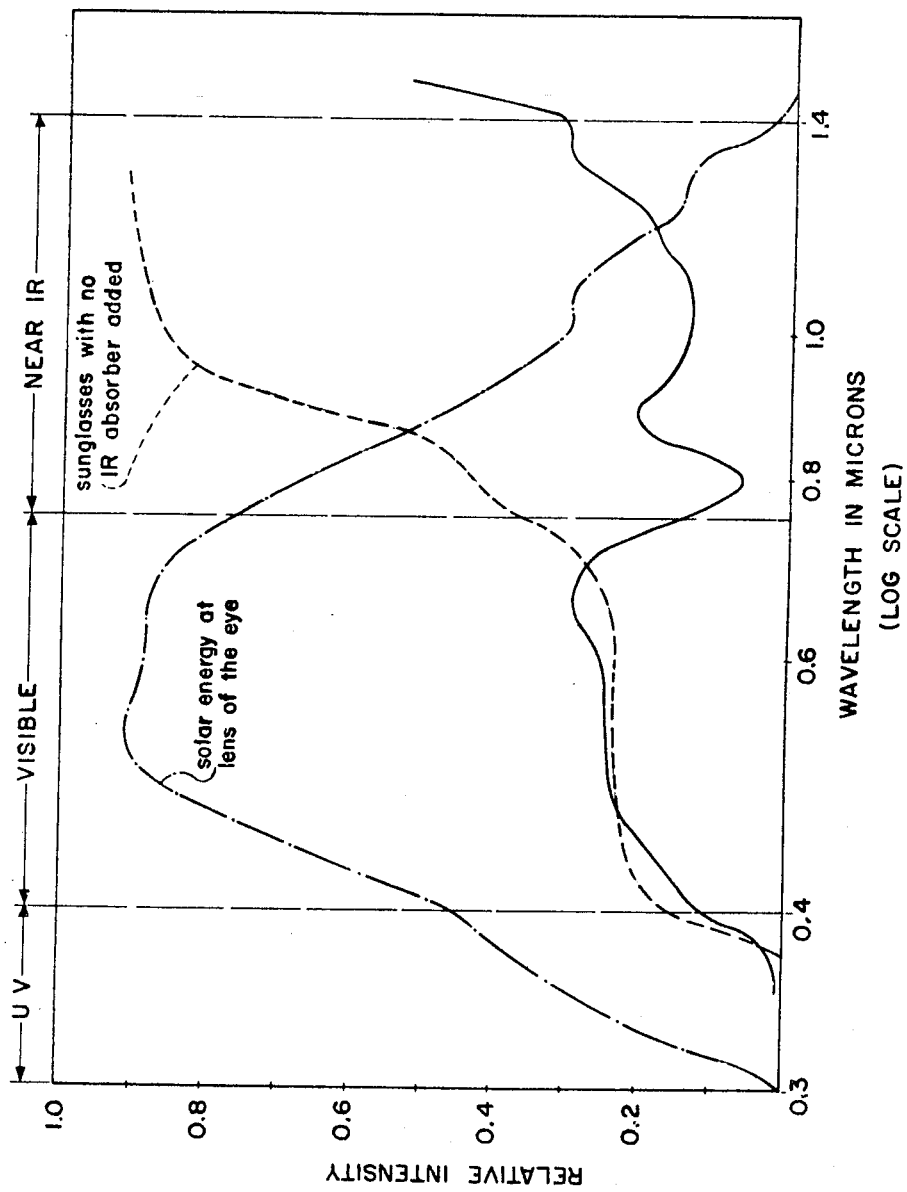

FIG. 5 is a graphic presentation including superposed curves showing the light transmittance of a plastic sunglass lens with and without an infrared absorber of the present invention; and FIG. 6 is a graphic presentation including superposed curves showing the light transmittance of a plastic sunglass lens including a mixture of infrared absorbers, one of which is illustrative of the class described by Formula A.

The aforementioned infrared absorbers, e.g., compounds of Formula A, are particularly useful in plastic optical systems and especially in plastic sunglass lens systems such as those known in the art as polarizing sunglasses.

A typical plastic sunglass of this type has an optical system comprising a light polarizer laminate between two sheets of transparent plastic, the outer or free surfaces of which may be provided with an abrasive-resistant coating. The polarizing sheet may, for example, be a molecularly oriented plastic sheet material which has been stained or dyed to render it light polarizing, e.g., molecularly oriented polyvinyl alcohol stained with iodine; the transparent plastic between which the polarizing sheet is laminated may, for example, be a thermoplastic cellulose derivative, e.g., cellulose nitrate, cellulose triacetate, cellulose acetate propionate, cellulose acetate butyrate, ethyl cellulose, etc.; and the abrasive-resistant coating may, for example, be a completely polymerized melamine formaldehyde resin, a thermosetting, cross-linked polymer such as a diethylenic-substituted polyalkyleneglycol, e.g., polymeric coatings formed by in situ polymerization of polyalkyleneglycol diesters of α-β-unsaturated carboxylic acids on the plastic sheet material, etc. Plastic laminations including materials of this description are disclosed, for example, in U.S. Pats. Nos. 2,237,567; 2,527,400; 2,554,850; 3,081,192; and 3,097,106.

While polarizing sunglasses of the foregoing description effectively diminish transmission of visible light to a desired comfortable level, e.g., to say from about 20–30% of the visible solar energy, an appreciable amount of invisible radiation, primarily in the ultraviolet and near infrared regions of the spectrum, is transmitted.

Figure 1:
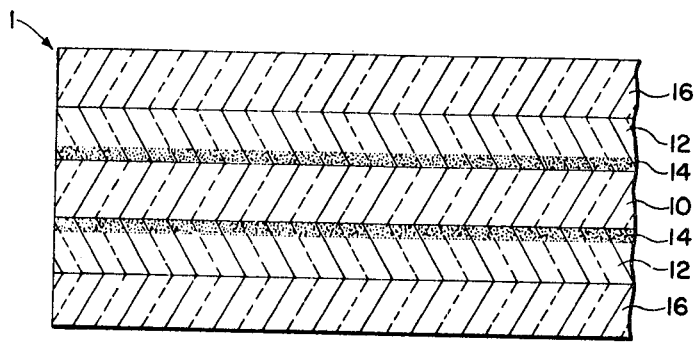
FIG. 1 is an enlarged diagrammatic sectional view of a novel lens system for sunglasses or the like according to the invention.
Figure 2:
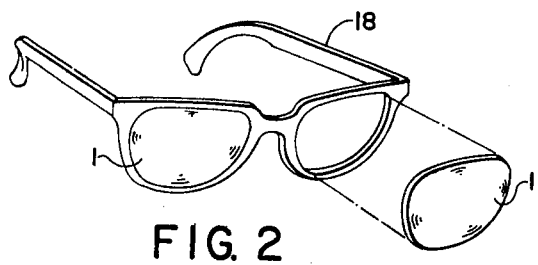
FIG. 2 is a partially exploded view of novel sunglasses having the lens system of FIG. 1.
Figure 3:
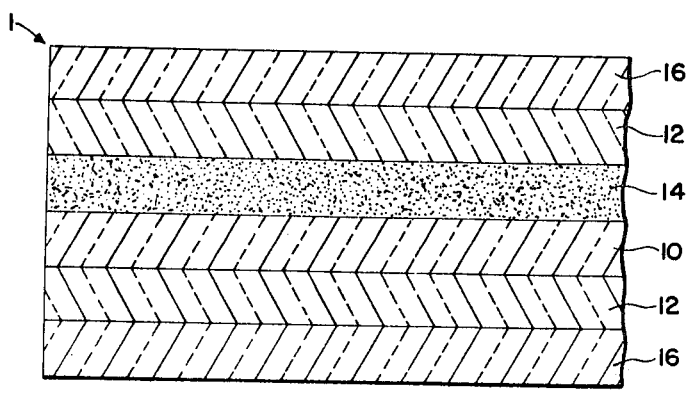
FIG. 3 is a view similar to FIG. 1 of another lens system of the invention.

The above discussed preferred embodiment of the present invention will be better understood by reference to FIGS. 1–3 of the accompanying drawings.

As shown in FIG. 1, one embodiment of this aspect of the invention comprises a plastic optical element 1, the outer surfaces of which are provided with an abrasive-resistant coating 16, such as those heretofore described. Between these outer layers are positioned, as by lamination, a pair of substantially or effectively transparent sheets of plastic 12, e.g., cellulose acetate butyrate, cellulose nitrate, cellulose acetate propionate, cellulose acetate, ethyl cellulose, etc.; a pair of layers or coatings 14 containing an IR absorber, e.g., one or more of the IR absorbers of Formula A, and a polarizing sheet material 10, e.g., a molecularly oriented polyvinyl alcohol which has been stained with iodine to render it light-polarizing and which may also have been borated in the manner disclosed in any of U.S. Pats. Nos. 2,445,579, Re.: 23,297 or 2,554,850.

The thicknesses of the various layers in the aforementioned plastic optical elements are not critical and may vary over wide ranges. It will be appreciated, however, that the layers are preferably as thin as possible, for reasons of economy, weight and to minimize distortion or refraction of transmitted light. By way of example only, the abrasion-resistant coating layers each may be on the order of 1 mil thick; the transparent plastic sheets may each be on the order of 0.0120–0.0140" thick; the polarizer on the order of 0.001" thick; and the infrared absorber-containing layers each on the order of about 0.1 to about 5.0 mils thick.

The infrared absorber-containing layers may be applied as a coating comprising a viscous solution containing the same or they may be imbibed into the transparent plastic sheets by contacting them with a solution containing one or more of the absorbers. The former method of application is preferred, however, since it has been found that greater amounts of the absorber can be added as a coating than can be added by imbibition. It will be appreciated, however, that even when applied as a coating, some of the absorber may inherently be imbibed. Whether the infrared absorber is added as a coating or by imbibition, useful solvents for that purpose include chloroform, methylene dichloride, toluene, tetrahydrofuran, etc., and mixtures of such solvents.

In addition to the layers or coatings shown in FIG. 1, the element may contain other layers introduced to provide suitable bonding surfaces to insure obtaining a strong lamination.

It will be appreciated that the plastic element is not restricted to the relationship of layers shown in FIG. 1. For example, the infrared absorber may be present between the outer coating 16 and the transparent plastic sheet 12. (In the event a scratch resistant coating 16 is applied by in situ polymerization, care should be exercised to avoid the use of polymerization catalysts, e.g., peroxides, which might attack the infrared absorber.) In lieu of having two separate layers 14 of infrared absorber, a single such layer may be provided, as shown in FIG. 3. In any event, optical elements of this invention may be employed in conventional eyeglass frames 18, as shown in FIG. 2.

The following examples illustrate manners for preparing infrared absorbers of the present invention and manner of using such absorbers in plastic optical systems as well as the advantages to be obtained from their use.

EXAMPLE 1

Figure 4:
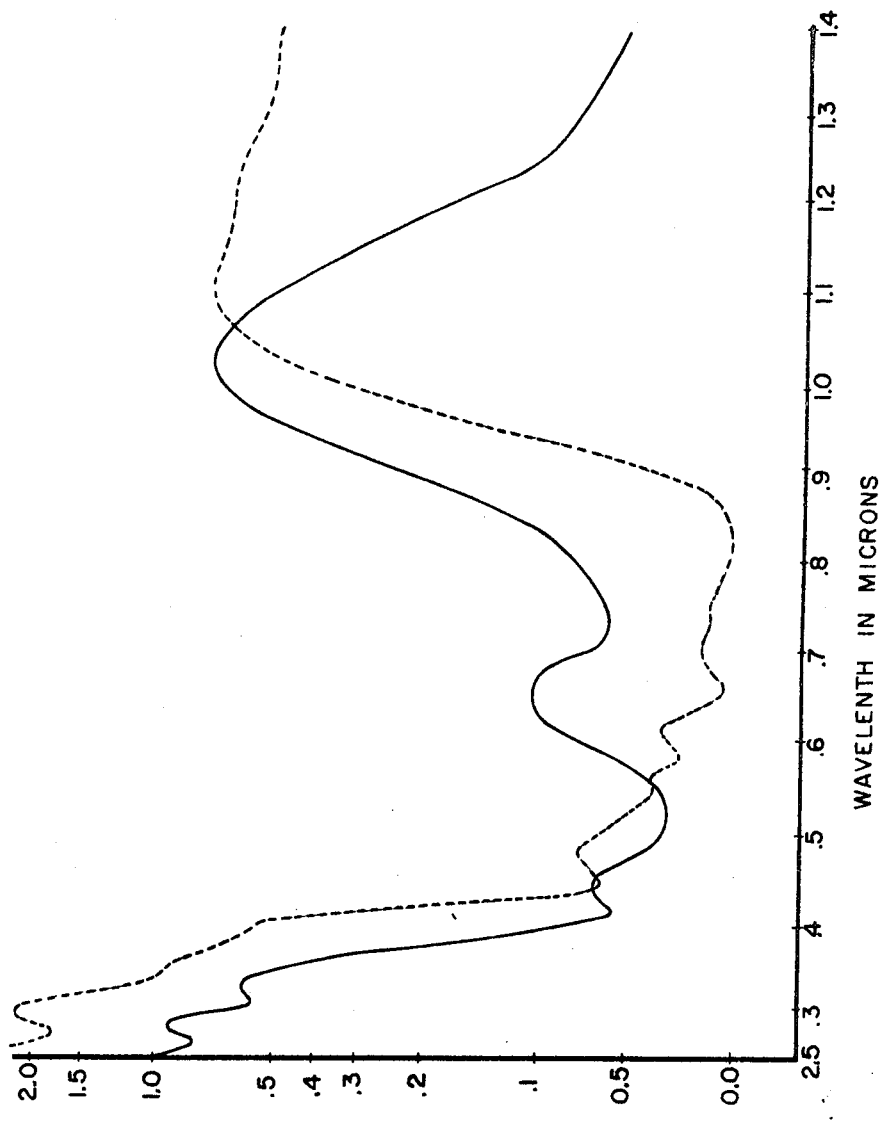
FIG. 4 is a graphic presentation of the light transmittance curves of particular infrared absorbers illustrative of the class described by Formula A.

An infrared absorber corresponding to Formula 1 may be prepared as follows:

Add a solution of 1.7 g. (57 mmoles) of nickel nitrate hexahydrate in 40 mls. of water to a solution of 2.10 g. (12 mmoles) of 1-mercapto-2-naphthol and 1.34 g. (24 mmoles) of potassium hydroxide in 50 mls. of ethanol. Add to the above, a solution of 4 g. (12 mmoles) of tetrabutyl ammonium bromide in 10 mls. of ethanol. Add enough acetone to the solution to dissolve any brown solid which may form. Bubble air through the solution for 3 hours. Collect the crystalline precipitate, wash with water and dry and purify by recrystallization from methanol. The melting point is 184–188° and $\lambda_{max}$. 11,500 m$\mu$; E=13,900. The transmittance curve of the above prepared compound is illustrated in FIG. 4 in broken lines.

EXAMPLE 2

An infrared absorber corresponding to Formula 5 may be prepared as follows:

Add a solution of 2.3 g. (8 mmoles) of nickel nitrate hexahydrate in 60 mls. of 70% aqueous ethanol to a solution of 2.9 g. (16 mmoles) of o-mercaptophenol and 1.3 g. (32 mmoles) of sodium hydroxide in 60 mls. of aqueous ethanol. Add to the above, a solution of 3 g. (9 mmoles) of tetrabutyl ammonium bromide dissolved in 15 mls. of ethanol. Bubble air through the solution to accomplish oxidation. Collect the crystalline precipitate, and dry. Recrystallize four times from acetone-toluene (1:3 v./v.). The melting point is 184–188° and $\lambda_{max}$. 10,250 m$\mu$; E=13,400. The transmittance curve of the above prepared compound is illustrated in FIG. 4 in solid lines.

The following example shows by way of illustration and not by way of limitation the preparation of an optical element in accordance with this invention.

EXAMPLE 3

To 700 cc. of chloroform and 300 cc. of trichloroethylene was added 70 g. of cellulose acetate butyrate chips. To 190 cc. of the resulting viscous solution was added 20 cc. of a chloroform solution which contained 0.052 g. of the infrared absorber of Formula 1, 0.040 g. Hastadye fast green C and 0.008 g. "Calco Oil Violet ZIRS" (tradename of American Cyanamid Company for a violet dye). The green and violet dyes were employed to provide a neutral gray product. The resulting mixture was coated onto each of two sheets of clear cellulose acetate butyrate at a speed of 6 ft./minute to provide on each sheet a layer containing 0.020 g. of combined IR absorbers per sq. ft. of surface area, the layer or coating being approximately 0.3 mil thick. On the free surface of each sheet of cellulose acetate butyrate (the surface opposite from that containing the IR absorber coating) there was then applied an abrasive-resistant coating such as described in Example 1 of the aforementioned U.S. Pat. No. 3,097,106 containing 0.6% by weight of "Uvinul 490" (tradename of General Aniline Company for an ultraviolet light absorber). The cellulose acetate butyrate on the surface of the infrared absorber-cellulose acetate butyrate coating was converted back to cellulose by treating it with 1:1:1 solution of sodium hydroxide, methanol and distilled water for 16 seconds at 46° C. The converted surface of each sheet was then washed and the two sheets were heated in an oven to drive off excess moisture. A solution containing 1.5 g. of polyvinyl alcohol (PVA) in 66.7 cc. of water and 33.3 cc. of methanol was coated on each of the converted surfaces at 6 ft./minute to provide a suitable bonding surface for the polarizer to be laminated therebetween. A molecularly oriented PVA (stretched four times its original length) was laminated to the PVA coating on one of the sheets at room temperature by applying to the respective laminating surfaces a laminating dope comprising a 2% PVA solution in water and pressing the surfaces together. The molecularly oriented PVA was then stained by imbibition in an iodine solution to render it light-polarizing. It was then imbibed in a boric acid solution of low concentration, dried in vacuo to remove excess liquid, and baked in a heating chamber to dry. The other sheet was then laminated in a similar manner to the free outer surface of the polarizer to provide a plastic optical product containing two of the IR absorbers.

The plastic sunglasses prepared in Example 3 were compared with a similar pair prepared in substantially the same manner but containing no infrared absorbers. The latter sunglasses also contained a substantially greater amount of ultraviolet absorber than that which was added to the abrasive-resistant coating in the example. For comparison purposes, the respective sunglasses were identical in all other relevant components. The transmission curves of the respective sunglasses are shown in FIG. 5 superposed with a curve showing the solar energy at the lens of the eye.

Looking first at the visible region of the spectrum, the sunglasses without the infrared absorber transmitted 24% of the kv. (energy transmitted at middle visual range, i.e., about 550 m$\mu$); whereas the sunglasses containing the infrared absorber transmitted only slightly less, 23.2%, thus indicating that there is no significant difference in transparency to visible light as a result of the incorporation of the infrared absorbers of this invention.

In the near infrared region (right hand side), the sunglasses without the infrared absorber transmitted 59.5% of the total near infrared energy otherwise available at the lens of the eye; whereas the sunglasses with the absorber transmitted only 25.4% of the total radiation in this region. It will thus be seen that the latter sunglasses transmit no substantially greater percent of the infrared than they do visible light. It will be appreciated, moreover, that by employing one or more additional infrared absorbers having a $\lambda_{max}$. in different regions of the infrared, the transmitted infrared shown on the chart may be further reduced to levels as low or lower than the transmitted visible light.

EXAMPLE 4

To 700 cc. of chloroform and 300 cc. of trichloroethylene was added 70 g. of cellulose butyrate chips. To 190 cc. of the resulting viscous solution was added 20 cc. of a chloroform solution containing the following:

| Infrared absorber | Grams |
|---|---|
| A [1] | 0.5220 |
| B [2] | 0.0647 |
| C [3] | 0.17033 |
| Tinuvin .326 [4] | 0.4750 |

(1) Infrared absorber A is the infrared absorber of Formula 1.

(2) Infrared absorber B is an infrared absorber of the following formula:

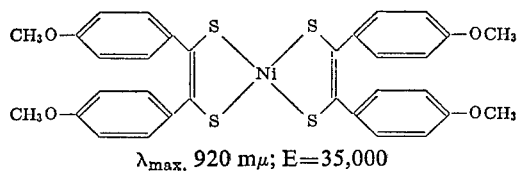

$\lambda_{max.}$ 920 m$\mu$; E=35,000

A manner for preparing the above infrared absorber is described in Example 1 of applicant's aforementioned copending application Ser. No. 577,576.

(3) Infrared absorber C is an infrared absorber of the following formula:

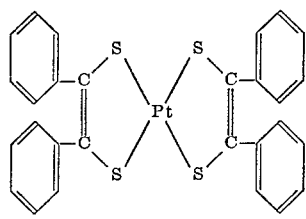

$\lambda_{max.}$=800 m$\mu$; E=51,600

A method for preparing the above infrared absorber is described in Example 4 of application Ser. No. 577,576.

(4) Tinuvin 326 is a commercially available ultraviolet absorber.

The above mixture was employed to produce a plastic optical lens system for sunglasses in the manner described in Example 3. FIG. 6 shows a comparison of the transmission curve of the lens system with the transmission curve of sunglasses employing a lens system which contains no infrared absorbers. As can be seen, the sunglasses without the infrared absorber transmitted 59.5% of the total near infrared energy whereas the sunglasses employing the lens system of the present example transmitted only 17.7% of the total radiation in this region. Accordingly, combinations of infrared absorbers of the present invention and combinations thereof with other infrared absorbers can be advantageously employed to produce plastic optical systems of various desired infrared transmission characteristics.

Since certain changes may be made in the above product and processes without departing from the scope of the invention herein involved, it is intended that all matter contained in the above description or shown in the accompanying drawings shall be interpreted as illustrative and not in a limiting sense.

What is claimed is:

1. A plastomeric element for filtering infrared light having as an infrared absorber thereof, a compound of the following formula:

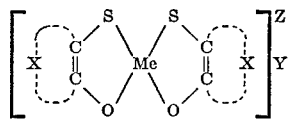

wherein Me is a metal selected from the group consisting of nickel, cobalt, zinc, copper, palladium or platinum which will provide a complex that is an effective infrared absorber; each X represents the number of atoms necessary to complete the same or different ring selected from the group consisting of a phenyl ring a, naphthyl ring, a substitutel phenyl ring, a substituted naphthyl ring, a five membered heterocyclic ring containing either nitrogen, sulfur or oxygen and substituted derivatives of such heterocyclic rings; Z is the integer 1 or 2 and represents the anionic charge on the complex and Y is a cation that can balance the charge Z.

2. A plastomeric element for filtering infrared light having as an infrared absorber thereof, a compound of the following formula:

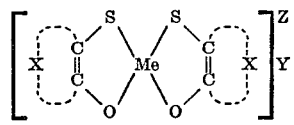

wherein Me is a metal selected from the group consisting of nickel, cobalt, zinc, copper, palladium or platinum which will provide a complex that is an effective infrared absorber; each X represents the number of atoms necessary to complete the same or different ring selected from the group consisting of a phenyl ring, a naphthyl ring, a substituted phenyl ring, a substituted naphthyl ring, a five membered heterocyclic ring containing either nitrogen, sulfur or oxygen and substituted derivatives of such heterocyclic rings; Z is the integer 1 or 2 and Y is the tetraphenyl arsonium cation if Z is 2 and the tetrabutylammonium cation if Z is 1.

3. An element of claim 2 wherein said infrared absorber is

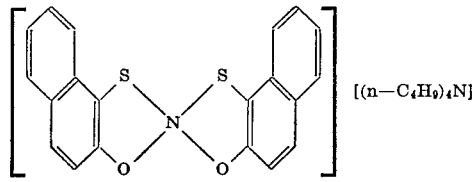

[$(n-C_4H_9)_4N$]

4. An elemental of claim 2 wherein said infrared absorber is

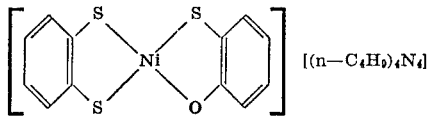

[$(n-C_4H_9)_4N$]

References Cited
UNITED STATES PATENTS

| 3,400,156 | 9/1968 | Milionis et al. | 260—576 |
| 3,429,732 | 2/1969 | Baitinger | 117—33.3 |
| 3,574,128 | 4/1971 | King | 252—300 |
| 3,588,216 | 6/1971 | Bloom | 350—1 |
| 3,637,693 | 1/1972 | Otterstedt | 260—251 |

OTHER REFERENCES

Balch, Electron-Transfer Series of the [M—O$_2$S$_2$] Type, Journal of the American Chemical Society, Apr. 9, 1969, pp. 1948–53.

CHARLES E. VAN HORN, Primary Examiner

U.S. Cl. X.R.

117—33.3; 350—1, 2, 155; 351—49; 260—327